United States Patent [19]

Boegh-Peterson

[11] Patent Number: 4,495,452
[45] Date of Patent: Jan. 22, 1985

[54] WINDSHIELD WIPER CONTROL HAVING A SENSOR AND A REPEATEDLY RENEWED OFFSET SIGNAL

[76] Inventor: Allan Boegh-Peterson, Flongvaenget 14, DK-2640 Hedehusene, Denmark

[21] Appl. No.: 525,035
[22] PCT Filed: Dec. 7, 1982
[86] PCT No.: PCT/DK82/00108
§ 371 Date: Aug. 8, 1983
§ 102(e) Date: Aug. 8, 1983
[87] PCT Pub. No.: WO83/02093
PCT Pub. Date: Jun. 23, 1983

[30] Foreign Application Priority Data

Dec. 8, 1981 [DK] Denmark .................. 5415/81

[51] Int. Cl.³ ..................................... H02P 1/04
[52] U.S. Cl. .......................... 318/444; 318/DIG. 2; 15/250 C
[58] Field of Search ............. 318/443, 444, DIG. 2, 318/483, 643; 15/250 C, 250.13; 200/61.05

[56] References Cited

U.S. PATENT DOCUMENTS

| | | | |
|---|---|---|---|
| 3,594,563 | 7/1971 | Bishop | 318/444 X |
| 3,786,330 | 1/1974 | Inoue et al. | 318/483 |
| 3,826,979 | 7/1974 | Steinmann | 318/483 X |
| 4,131,834 | 12/1978 | Blaszkowski | 318/483 |
| 4,388,574 | 6/1983 | Bois et al. | 318/443 |

FOREIGN PATENT DOCUMENTS

| | | | |
|---|---|---|---|
| 2361579 | 6/1975 | Fed. Rep. of Germany . | |
| 0079215 | 7/1978 | Japan | 318/443 |
| 0099441 | 7/1980 | Japan . | |
| 0152642 | 11/1980 | Japan . | |
| 7810685 | 4/1980 | Sweden . | |
| 1382261 | 1/1975 | United Kingdom | 318/DIG. 2 |

Primary Examiner—Stanley J. Witkowski
Assistant Examiner—Bentsu Ro
Attorney, Agent, or Firm—Dennison, Meserole, Pollack & Scheiner

[57] ABSTRACT

A windshield wiper control, e.g. for use in automobiles, receives information as to the amount of humidity on the windshield from a sensor (1) which is arranged within the area which is swept by the windshield wipers, and adjust the wiper frequency in relation thereto. The windshield wiper control includes a circuit (2) which remembers the signal from the sensor just after the windshield wiper has passed the sensor. The signal is compared to the signal directly from the sensor by a comparator (3). Having detected a certain change, the amplifier (4) is activated which turns on the wiper motor through a relay (5). The sensor may be of the capacitive type.

1 Claim, 1 Drawing Figure

WINDSHIELD WIPER CONTROL HAVING A SENSOR AND A REPEATEDLY RENEWED OFFSET SIGNAL

BACKGROUND OF THE INVENTION

A windshield wiper control receives information as to the amount of moisture on the windshield through a sensor which is arranged within the area which is swept by the windshield wipers.

In practice it has turned out that merely when driving in definitely rainy weather there is a need for continuous operation of the windshield wipers. In drizzle or humid weather it is often necessary to intervene manually in the wiping frequency in order to avoid that the wipers are operated on a too dry windshield, which may result in a reduced view and unnecessary wear of both the wiper motor and the wiper blade. It is known that by means of a conventional windshield wiper control, fixed intervals between the individual activation of the wipers may be obtained. However, manual intervention is still needed for adaption of the length of the intervals in relation to changing weather conditions.

SUMMARY OF THE INVENTION

The windshield wiper control according to the invention is of a kind which receives information as to the amount of moisture on the windshield through a sensor which is arranged on the windshield within the area which is swept by the windshield wipers. From this the wiper frequency is adjusted in relation to the current conditions so that, depending on the rain intensity, adequate intervals are inserted in the activation of the wipers. The active area of the sensor has to be so large that the signal which is generated is representative of the condition of the windshield in its entity. In practice, it has turned out that approximately 25 cm$^2$ is sufficient. The sensor may be of the capacitive type and may generate an AC-signal the frequency of which is indicative of the relative humidity of the windshield. It is known to compare the signal which is received from the sensor with a fixed reference and to activate the windshield wipers when exceeding this reference. In practice it is, however, very difficult to make this principle provide a stable activation of the wipers. Partly, it is difficult to obtain sufficient temperature stability of especially the sensor and partly, impurities which do not normally disturb the view may affect the sensor and turn on the wipers unintentionally. In case a sufficient amount of water is not present for washing away these impurities, the view is impaired by wiping. Thus, it may be necessary to clean the windshield manually in order to stop the activation of the windshield wipers.

BRIEF DESCRIPTION OF THE DRAWING

The principle of the invention will be more clearly understood by reference to the description of the preferred embodiment taken in conjunction with the sole drawing in which.

THE INVENTION

Figure 1:
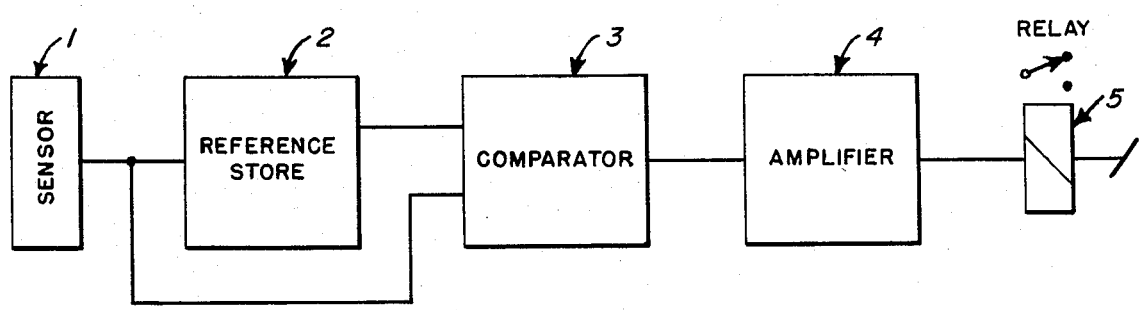
FIG. 1 shows the block diagram of the repeatedly renewed offset windshield wiper control.

The windshield wiper control according to the invention is characterized in that the reference store (2) is connected to the output of the sensor (1) so that each time the wiper has just passed the sensor, the sensor signal is written in the store (2) and is used as reference at the next comparison. Thereby it is obtained thta the reference is always an expression for the cleanest windshield possible under the given circumstances. The wipers are not activated until a certain change of the signal from the sensor relative to the reference has been detected. In other words when a certain reduction of the view has taken place in relation to the view obtained at the last passage of the wipers. Therefore, the activation time is automatically adjusted in relation to the working conditions. Impurities which are not immediately removable by means of the wipers will e.g. not disturb the function. Neither will a worn wiper blade which is not capable of completely removing the water disturb, as these new working conditions are merely entered into the reference. If, on the other hand, a fixed reference had been employed, the wipers would be activated constantly in an attempt to remove the condition which influenced the sensor. This new principle implies that the windshield wiper control does not have to be adjusted after it has been mounted. Different conditions such as the arrangement of the sensor, the thickness of the glass and the type of glass etc. which vary from installation to installation merely results in different reference values.

It may happen that a windshield wiper control which is turned on is not activated by rain for a time period and, consequently, the wipers are not activated. In this solution, the reference will not be updated, so that e.g. temperature drift of the sensor signal may erroneously activate the wipers. In order to eliminate this situation, the windshield wiper control according to the invention includes a circuit which allows the reference to follow such slow changes of the signal from the sensor. This may e.g. be obtained by making the reference follow the sensor signal with an appropriately large time constant so that the sensor signal may not drift in relation to the reference value.

Furthermore, the windshield wiper control is equipped with a circuit which provides for a single activation of the windshield wipers when the windshield wiper control is turned on so that the reference is updated. A further circuit provides for automatic change to continuous activation of the wipers, when the intervals between the activation become so short that continuous activation is more appropriate.

The windshield wiper control is in principal shown in FIG. 1. The signal from the sensor (1) is led to a circuit (2) which remembers the maximum (or minimum) value of the signal which is detected after passage of the windshield wipers past the sensor. The circuit (2) also allows the reference to follow slow changes of the sensor signal, e.g. caused by temperature drift. The reference signal is compared to the signal generated by the sensor by means of the comparator (3). When a certain change is reached, the amplifier (4) is activated which turns on the wiper motor via a relay (5).

I claim:

1. A windshield wiper control systems for automatic operation based upon the presence on a windshield of a predetermined amount of moisture, including a wiper, a motor for driving the wiper, a moisture sensor arranged within the area swept by the wiper, a reference store connected to the output of the sensor, a reference signal stored in said store, and means to compare the sensor output signal to said reference signal so that the motor is activated when the moisture amount exceeds the amount of the reference signal, so that each time the wiper has just passed the sensor, the sensor output signal is written to the store and is retained as a reference at the next comparison, and circuit means allowing said reference signal to continuously follow slow changes of the signal from the sensor.

* * * * *